Oct. 28, 1924.
N. A. ROYER
GRINDER FOR LAWN MOWERS
Filed Sept. 23, 1922
1,513,276
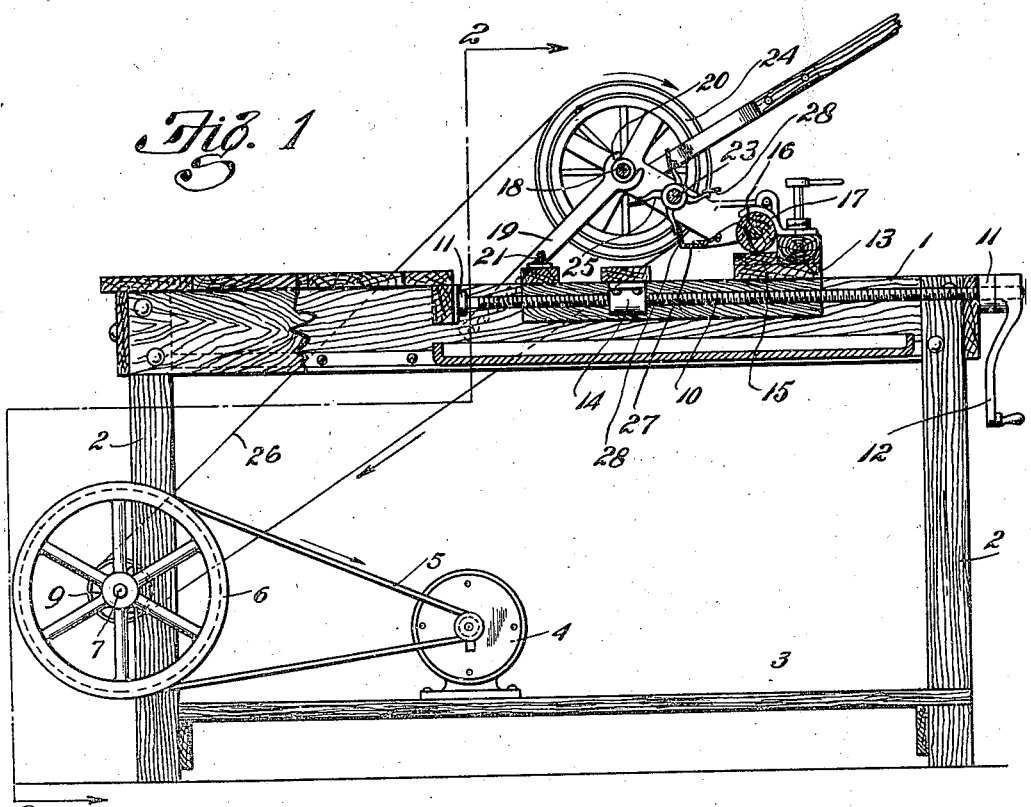
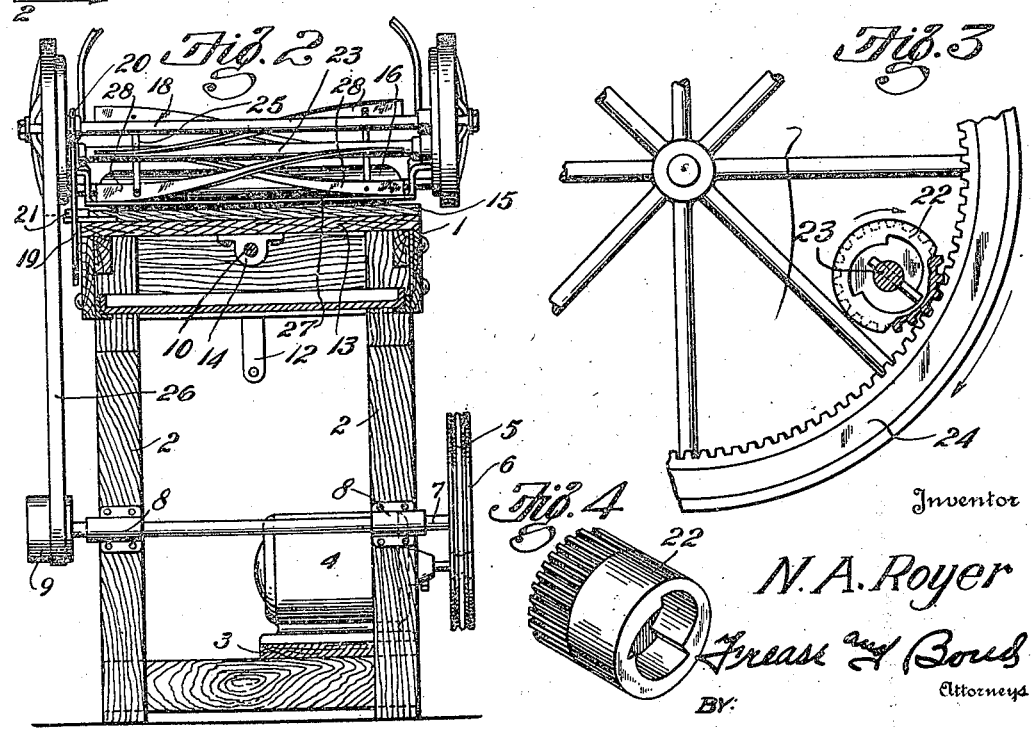
Inventor
N. A. Royer
BY: Frease and Bond
Attorneys Patented Oct. 28, 1924.

1,513,276

UNITED STATES PATENT OFFICE.

NATHANIEL A. ROYER, OF HARTVILLE, OHIO.

GRINDER FOR LAWN MOWERS.

Application filed September 23, 1922. Serial No. 590,009.

*To all whom it may concern:*

Be it known that I, NATHANIEL A. ROYER, a citizen of the United States, residing at Hartville, in the county of Stark and State of Ohio, have invented a new and useful Grinder for Lawn Mowers, of which the following is a specification.

This invention relates to grinders for lawn mowers and has for its objects to provide a device by means of which the blades upon the reel and the cutter bar are ground together by reversing the movement of the reel and adjusting the cutter bar to contact with the edges of the blades upon the reel as the same is rotated, a mixture of oil and emery or the like being placed upon the cutter bar to perform the grinding of the blades.

The above and other objects may be attained by removing the ratchet gears from the traction wheels of the lawn mower and reversing the same to drive the reel in the reverse direction, one of the traction wheels of the motor being connected to a suitable source of power as by a belt or other gearing, for the purpose of driving the wheel in the reverse direction.

A preferred embodiment of the invention thus set forth in general terms is illustrated in the accompanying drawing, in which—

Figure 1 is a side elevation, partly in section of the improved grinder for lawn mowers;

Fig. 2, a section on the line 2—2, Fig. 1;

Fig. 3, an enlarged fragmentary view of a portion of one of the traction wheels of the lawn mower and the ratchet gear which drives the reel; and Fig. 4, a detail perspective view of the ratchet gear.

Similar numerals of reference indicate corresponding parts throughout the drawing.

A bed 1 is mounted upon standards or uprights 2, a shelf 3 being supported near the lower ends of said uprights for the purpose of supporting the motor 4 which is connected as by the belt gearing 5 driven in the direction of the arrow, with the drive pulley 6 mounted upon a shaft 7 journaled in bearings 8 upon the adjacent uprights. A smaller pulley 9 is fixed upon the shaft 7.

A screw 10 is journaled in bearings 11 in the bed 1 and provided with a handle 12 for rotating the same, a slidable frame 13 being mounted for longitudinal slidable movement upon the bed and being provided with a nut 14 engaging the screw 10.

A block 15 upon the slidable frame supports the grass roller 16 of the motor, a clamp 17 being carried by said block and engaging the upper surface of the roller, clamping the same upon the slidable frame. The shaft 18 of the traction wheels of the motor is supported upon a notched bar 19 having the forked upper end 20 which receives the shaft, one of the notches of the bar engaging the flange 21 mounted upon the slidable frame.

The ratchet gears 22, which are mounted upon the reel shaft 23 and engage the internal gears of the traction wheels 24, are removed and reversed in order to drive the reel 25 in the reverse direction when the traction wheels are rotated by the belt 26 driven in the direction of the arrow shown in Fig. 1, said belt being located over the pulley 9 and over the adjacent traction wheel.

In the operation of the device to grind a lawn mower, the mower is placed upon the sliding frame 13 as shown in Fig. 1, the grass roller 16 being clamped upon the block 15 by the clamp 17 and the forward end of the mower adjusted by means of the notched bar 19. The screw 10 is then operated to tighten the belt 26 upon the pulley 9 and traction wheel 24 and the cutter bar 27 is adjusted to engage the blades 28 upon the reel 25 of the mower.

A mixture of oil and powdered emery or the like is then poured or smeared upon the cutter bar 27 and the mower is started, driving the belt 26 in the direction shown in Fig. 1, driving the reel 25 in the reverse direction, the blades 28 thereof grinding into the edge of the cutter bar as the reel is reversed, thus sharpening the cutter bar and the blades upon the reel at the same time and grinding all of said blades to properly correspond with the cutter bar.

When the mower is properly ground, it is only necessary to remove the ratchet gears 22 and replace the same properly upon the reel shaft when the mower is ready for use.

I claim:

1. In a machine for sharpening lawn mowers, a bed, a frame slidable on the bed and having means for supporting a lawn mower, a drive pulley on the bed, and a belt for connecting the drive pulley with a traction wheel of a lawn mower for turning the cutting wheel against the cutter bar to sharpen the same.

2. In a machine for sharpening lawn mowers, a bed, a frame slidable on the bed and having means for supporting a lawn mower, a drive pulley on the bed, a belt for connecting the drive pulley with a traction wheel of the lawn mower for turning the cutting reel against the cutter bar to sharpen the same and means for sliding said frame to tighten the belt.

3. In a machine for sharpening lawn mowers, a bed, a frame slidable on the bed and having means for supporting a lawn mower, a drive pulley on the bed, a belt for connecting the drive pulley with one of the wheels of the lawn mower to turn the cutting reel against the cutter bar to sharpen the same and a screw for adjusting the sliding frame to tighten the belt gearing.

NATHANIEL A. ROYER.